Patented May 3, 1927.

1,626,638

UNITED STATES PATENT OFFICE.

WILLIAM CHARLES SPROESSER, OF BLOOMFIELD, NEW JERSEY, ASSIGNOR TO WESTINGHOUSE LAMP COMPANY, A CORPORATION OF PENNSYLVANIA.

INTRODUCTION OF CLEAN-UP AGENTS INTO EVACUATED VESSELS.

No Drawing.    Application filed May 5, 1923.   Serial No. 637,033.

This invention relates to the introduction of clean-up agents into evacuated vessels and more particularly to an improved method of introducing phosphorus and the like into evacuated devices; for example, incandescent electric lamps.

An object of my invention is the introduction of a stable compound or mixture into an evacuated bulb, in such form that it will remain substantially pure and uncontaminated until heated and will produce, on reaction with an intermixed reducing agent, pure phosphorus or the like to function efficiently to clean-up the residual gases.

Another object of my invention is the introduction of a clean-up or vacuum-improving material in the form of a compound thereof mixed with a reducing agent, so that the clean-up material is unaffected by atmospheric contamination until the mixture is in place in the device and the compound is reduced, when heated, with the liberation of the desired amount of clean-up material.

A further object of my invention is the introduction of phosphorus as a clean-up material into evacuated vessels, in a form which is stable and free from moisture and the quantity of which may be accurately controlled and loss at sealing-in avoided.

A still further object of my invention is the introduction of phosphorus into an evacuated vessel in the form of a compound thereof mixed with a material, for example, aluminum, capable after an initial heating, of reducing the compound by an exothermic reaction, with the liberation of free phosphorus.

An additional object of my invention is the preparation of a moisture free mixture for effecting a clean-up action in evacuated devices and which is not put into active condition until heat is applied thereto.

Other objects and advantages of the invention will become apparent as the description proceeds.

Certain clean-up or vacuum-improving materials, for example, phosphorus, are readily contaminated by the atmosphere and moisture and it is, therefore, difficult to introduce the same in a pure form and in accurately determined quantities into evacuated devices. As heretofore employed, phosphorus, for example, has been introduced in the form of a suspension upon filamentary material and it has been found difficult to avoid introduction of moisture at the same time. Even though red phosphorus is employed, it has been found difficult to introduce it in a pure form into an incandescent electric lamp or an evacuated device, because of its liability to form phosphorus pentoxide which, as is well known, readily absorbs moisture to form phosphoric acid.

According to my invention, I obviate the difficulties attending the introduction of phosphorus and other highly active clean-up agents into evacuated devices by using, instead of the free clean-up material, a compound thereof mixed with a reducing agent or agents, adapted to cause the liberation of free phosphorus or other clean-up material upon a preliminary heating thereof. For example, phosphorus pentoxide may be fused with cryolite, and the resulting product is a white insoluble mixture or compound, stable in air and not liable to absorb moisture therefrom.

Such a resulting product may be mixed with powdered aluminum or other suitable reducing agent and, upon an initial heating thereof, a vigorous reaction takes place, with the liberation or generation of free phosphorus. The particular reaction mentioned is strongly exothermic, so that, once started, with an initial application of heat, the reaction will continue to completion.

My invention may be better understood by the following more detailed description thereof.

The specific example which will be described, applies particularly to the introduction of phosphorus, as a clean-up agent, into an evacuated incandescent electric lamp, although it is obvious that a similar method may be employed for introducing other highly-active clean-up materials into any evacuated device. Equal parts, by weight, of cryolite ($Na_3AlF_6$) and phosphorus pentoxide ($P_2O_5$) may be fused together and the resulting product will be found to be white, insoluble and stable in air, without being liable to absorb moisture therefrom. Cryolite is suggested as a preferred material used with phosphorus pentoxide because it is a good getter and functions efficiently as a candle-power-maintenance substance upon liberation in the lamp.

The resulting product may be powdered and mixed with about the same amount by weight of finely-divided aluminum. Although aluminum is preferred, other substances, for example, arsenic, antimony, sodium and the like, may be used. If a metal like sodium, readily attacked by air and moisture, is used, it may be found desirable to alloy, amalgamate or mix it with some protective material before combining it with the compound of phosphorus or the like. The resulting mixture is preferably applied to the mount of the lamp into which it is desired to introduce the phosphorus, either directly on the filament or on the arbor and heated to cause a reaction between the aluminum, or other reducing material used, and the compound of phosphorus, with the liberation of free phosphorus therein.

Although the mixture may be applied in any desired manner, it is preferably mixed with a varnish-like binder, such as a film-stock solution or a solution of nitro-cellulose in amyl-acetate and applied to the filament in a well-known manner, as by drawing the filament through it or as a paint or spray. The filament would be supported on a suitable spider and form a mount, as is well known in the art. As the phosphorus compound, with a reducing agent, is stable until heated to the reaction temperature, the amount of phosphorus introduced by the aforementioned method may be accurately controlled, as none of the mixture originally applied is wasted or lost during sealing-in but is preserved until heated to the desired degree when the lamp is first flashed. After applying the mixture to the mount, sealing the mount into a bulb, exhausting the bulb, flashing the lamp to cause a clean-up of the residual atmosphere, it will be found that, not only is a clean-up effected by the liberated phosphorus, but the cryolite content of the mixture when vaporized from the filament, for example, serves efficiently as a candle-power-maintenance material.

If applied other than to the filament, the mixture is preferably made into a paste or pellet, with binder solution, as before used, and fastened to a plate of magnesium or the like on the arbor. The paste or pellet may then be heated, after the bulb containing it has been evacuated, in any desired manner, for example, by high-frequency induction, to cause the mixture to react with the liberation of the phosphorus or other clean-up material.

Although phosphorus pentoxide has been mentioned as the compound of phorphorus employed, it is obvious that I do not wish to be restricted to this particular compound, as other substances, for example, di-sodium hydrogen phosphate ($Na_2HPO_4$) and calcium phosphate ($Ca_3(PO_4)_2$) react with aluminum or its equivalent to form, as one of the reaction products, free phosphorus.

Briefly summarized, the advantages gained by using the foregoing method of introducing phosphorus and the like into evacuated devices are:—

(1) A definite amount of clean-up material may be introduced within the evacuated device. According to the present practice, the amount of phosphorus introduced is dependent upon the length of time and the degree the bulb is heated and the duration of the exhaust.

(2) The introduction of small amounts of moisture is prevented. It is very difficult to get moisture-free phosphorus, for it reacts with air to form phosphorus pentoxide, which, in turn, picks up moisture to form phosphoric acid.

(3) Discoloration of bulbs, occurring when free phosphorus is introduced directly are avoided by this method.

(4) No phosphorus is lost at the sealing-in operation, because the compound introduced is not heated at that time to the reaction temperature thereof.

It should be understood that although a preferred embodiment of the invention has been described in detail, I do not wish to be limited thereto, as my invention broadly covers any reaction of a phosphorus or other similar clean-up material-containing substance, with another material or materials to form, among the reaction products, elemental phosphorus or other clean-up material and my invention is only limited by the spirit and scope of the appended claims.

What is claimed is:

1. The method of introducing a clean-up material into an evacuated vessel comprising forming a moisture-free substance containing the material in a reducible form, mixing a reducing agent with the substance, introducing the mixture into the vessel and initially heating the same to cause a liberation of the desired clean-up material.

2. The method of introducing a vacuum-improving substance into an evacuated vessel comprising mixing a compound thereof with a reducing agent and a liquid binder, applying some of said mixture in said device and heating the same to cause a reaction and liberation of vacuum-improving material.

3. The method of introducing phosphorus into an evacuated vessel comprising mixing a compound thereof with a reducing agent, introducing the mixture into the vessel and heating the same to cause a liberation of free phosphorus therein.

4. The method of introducing phosphorus into an evacuated vessel comprising forming a compound thereof which does not absorb moisture, mixing a reducing agent therewith, introducing the mixture into the vessel and heating to cause a liberation of free phosphorus therein.

5. The method of introducing phosphorus into an envelope adapted to be evacuated comprising fusing phosphorus pentoxide and cryolite, mixing the compound of phosphorus formed with a reducing agent and a binder solution, applying the mixture to a filament, introducing the filament into the envelope, exhausting the same and flashing the filament to cause the liberation of free phosphorus therein.

6. The method of introducing phosphorus into an evacuated vessel comprising fusing phosphorus pentoxide and cryolite, mixing aluminum therewith, introducing the mixture into the vessel and heating the same to the reaction temperature.

7. The method of introducing phosphorus into an incandescent electric lamp or the like comprising mixing a phosphorus compound with a reducing agent, applying the same to a component part in the lamp, evacuating the same and heating the mixture to the reaction temperature.

8. The method of introducing phosphorus into an incandescent electric lamp comprising an evacuated envelope and a spider supporting an incandescible filament, comprising mixing a compound of phosphorus with a reducing agent and a binder solution and applying the mixture to the filament, introducing the filament into the envelope, exhausting the envelope and flashing the filament to cause the liberation of free phosphorus.

9. The method of introducing phosphorus into an incandescent electric lamp including an envelope adapted to be evacuated and a spider supporting an incandescible filament comprising fusing cryolite and phosphorus pentoxide, mixing the same with aluminum and applying the mixture with a suitable binder on the incandescible filament, introducing the spider and the supported filament into the envelope, evacuating the envelope and heating the filament to the reaction temperature of the mixture thereon.

10. The method of introducing phosphorus into an incandescent electric lamp including an evacuated envelope and a mount comprising an incandescible filament, said method comprising fusing approximately equal parts of cryolite and phosphorus pentoxide, powdering the resulting product, mixing about an equal proportion of finely divided aluminum therewith, applying the mixture to the filament by means of a suitable binder, introducing the amount into the envelope, evacuating the envelope and heating the filament until the mixture thereof reacts with the liberation of phosphorus.

11. The method of introducing phosphorus into an evacuated envelope adapted to enclose an incandescible filament supported on a spider comprising mixing approximately equal parts of cryolite and phosphorus pentoxide, fusing the mixture, powdering the product, mixing approximately equal parts of finely divided aluminum therewith, adding to the resulting mixture a suitable varnish-like binding material, applying the mixture to the filament, introducing the same into the envelope, exhausting the same and heating the filament to a temperature sufficient to cause the mixture thereon to react with the liberation of free phosphorus therefrom.

12. The method of introducing phosphorus into an incandescent electric lamp including an arbor and a conductive member in a bulb comprising mixing cryolite and phosphorus pentoxide, fusing the mixture, powdering the product, mixing finely divided aluminum and a suitable binder therewith, attaching some of the mixture to the conductive member, sealing the arbor into the bulb, exhausting the bulb and heating the conductive member to cause the mixture thereon to react with the liberation of free phosphorus therefrom.

13. A mixture of a compound of phosphorus and a reducing agent for effecting the clean-up of gases in an evacuated device.

14. A mixture of a stable compound of phosphorus and aluminum for effecting a clean-up action in an evacuated device.

15. A mixture formed by fusing phosphorus pentoxide and cryolite and mixing the powdered product with aluminum for effecting a clean-up action in evacuated devices.

16. A mixture formed by fusing phosphorus pentoxide and cryolite, powdering and mixing with about an equal amount of finely-divided aluminum and a binder, for cleaning-up residual gases in an evacuated device.

In testimony whereof, I have hereunto subscribed my name this 4th day of May 1923.

WILLIAM CHARLES SPROESSER.